(12) United States Patent
Muterspaugh

(10) Patent No.: US 7,199,562 B2
(45) Date of Patent: Apr. 3, 2007

(54) LINE FREQUENCY SWITCHING REGULATOR

(75) Inventor: Max Ward Muterspaugh, Indianapolis, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 56 days.

(21) Appl. No.: 10/509,943

(22) PCT Filed: Apr. 2, 2003

(86) PCT No.: PCT/US03/10013

§ 371 (c)(1),
(2), (4) Date: Oct. 4, 2004

(87) PCT Pub. No.: WO03/085813

PCT Pub. Date: Oct. 16, 2003

(65) Prior Publication Data

US 2006/0164048 A1   Jul. 27, 2006

Related U.S. Application Data

(60) Provisional application No. 60/370,072, filed on Apr. 4, 2002.

(51) Int. Cl.
*G05F 1/10* (2006.01)
*H02M 5/42* (2006.01)

(52) U.S. Cl. ......................... 323/235; 363/86
(58) Field of Classification Search ................ 323/235; 363/86
See application file for complete search history.

(56) References Cited

U.S. PATENT DOCUMENTS

| 3,758,844 A | 9/1973 | Harkenrider et al. |
| 4,507,546 A | 3/1985 | Fortune et al. |
| 5,399,958 A | 3/1995 | Iyoda |
| 5,521,808 A * | 5/1996 | Marusik et al. ............ 363/49 |
| 5,828,206 A | 10/1998 | Hosono et al. |

(Continued)

FOREIGN PATENT DOCUMENTS

EP   0811901   12/1997

OTHER PUBLICATIONS

Paper Entitled "DC Power Supply,, MPB Series, Model 6282A, Serial Number Prefix 6G", Hewlett Packard, 10 pages, no date.

*Primary Examiner*—Shawn Riley
(74) *Attorney, Agent, or Firm*—Joseph J. Laks; Robert D. Shedd; William A. Lagoni

(57) ABSTRACT

In a switch mode power supply, a mains supply voltage source is coupled to a rectifier for producing an input supply voltage. The rectified input supply voltage is coupled unfiltered to an input of the SMPS. A switching power transistor having a controllable duty cycle is controlled by a duty cycle modulated signal for producing a regulated output supply voltage from the rectified input supply voltage. The periodic waveform of the mains supply voltage is used to establish the timings of the duty cycle modulated signal. In each cycle, current flow is initiated in the transistor, when the transistor is already fully turned on and a voltage developed between its main current conducting terminals is low or close to zero volts. When the output supply voltage attains the required level the transistor is turned off. Hysteresis is provided for preventing the transistor from turning on again in the same cycle, after it has been turned off.

9 Claims, 2 Drawing Sheets

U.S. PATENT DOCUMENTS 6,166,527 A    12/2000  Dwelley et al.
6,218,819 B1   4/2001   Tiwari
6,388,433 B2   5/2002   Marty

* cited by examiner

LINE FREQUENCY SWITCHING REGULATOR

CROSS REFERENCE TO RELATED APPLICATIONS

This application claims the benefit, under 35 U.S.C. § 365 of International Application PCT/US03/10013, filed Apr. 2, 2003, which was published in accordance with PCT Article 21(2) on Oct. 16, 2003 in English and which claims the benefit of provisional application Ser. No. 60/370,072, filed Apr. 4, 2002.

BACKGROUND OF THE INVENTION

The invention relates to a switch mode power supply for a communication device.

Typically, a switch mode power supply (SMPS), includes a switching power transistor having a controllable duty cycle that is controlled by a duty cycle modulated signal. An alternating current (AC) mains supply voltage source is coupled to a rectifier for producing an input supply voltage for energizing the SMPS. Typically, a large input filter capacitor is coupled at an input of the SMPS for filtering AC components from a rectified input supply voltage produced in the rectifier. It may be desirable to eliminate the large input filter capacitor.

A typical SMPS requires the generation of a periodic switching signal to establish the timings of the duty cycle modulated signal. It may be desirable to utilize the periodic waveform of the mains supply voltage to establish the timings of the duty cycle modulated signal. Thereby, SMPS operation can be obtained without an added circuit complexity associated with the generation of the periodic switching signal.

In a SMPS, embodying an inventive feature, a mains supply voltage source is coupled to a rectifier for producing an input supply voltage. The rectified input supply voltage is coupled unfiltered to an input of the SMPS. A switching power transistor having a controllable duty cycle is controlled by a duty cycle modulated signal for producing a regulated output supply voltage from the rectified input supply voltage. The periodic waveform of the mains supply voltage is used to establish the timings of the duty cycle modulated signal.

In carrying out an inventive feature, in each cycle, current flow is initiated in the transistor, when the transistor is already fully turned on and a voltage developed between its main current conducting terminals is low or close to zero volts. Thereby, power dissipation is, advantageously, small. When the output supply voltage attains a threshold level the transistor is turned off.

In carrying out another inventive feature, hysteresis is provided for preventing the transistor from turning on again in the same cycle, after it has been turned off. Thereby, advantageously, the transistor is prevented from turning on again in the same cycle, when the voltage developed between its main current conducting terminals is no longer close to zero volts. Consequently, increased power dissipation is, advantageously, prevented.

SUMMARY OF THE INVENTION

A switch mode power supply, embodying an inventive feature includes a source of a periodic input supply voltage and a filter capacitor. A power, switching semiconductor is coupled to the source and to the capacitor for generating periodic rectified supply current pulse in the semiconductor having a first transition in a first direction and a second transition at an opposite direction at a frequency related to that of the input supply voltage to develop an output supply voltage in the capacitor. A source of a first switch control signal is provided for conditioning the semiconductor to conduction prior to the first transition in a manner to provide for zero voltage switching in the semiconductor, during the first transition. A comparator is responsive to a signal indicative of the output supply voltage and to a signal at a reference level for generating a second switch control signal for the semiconductor to produce the second transition of the current pulse that is modulated, in accordance with a difference between the output supply voltage and the reference level signal. The comparator has a positive feedback signal path that provides hysteresis with respect to the output supply voltage.

DESCRIPTION OF THE PREFERRED EMBODIMENTS

Figure 2:
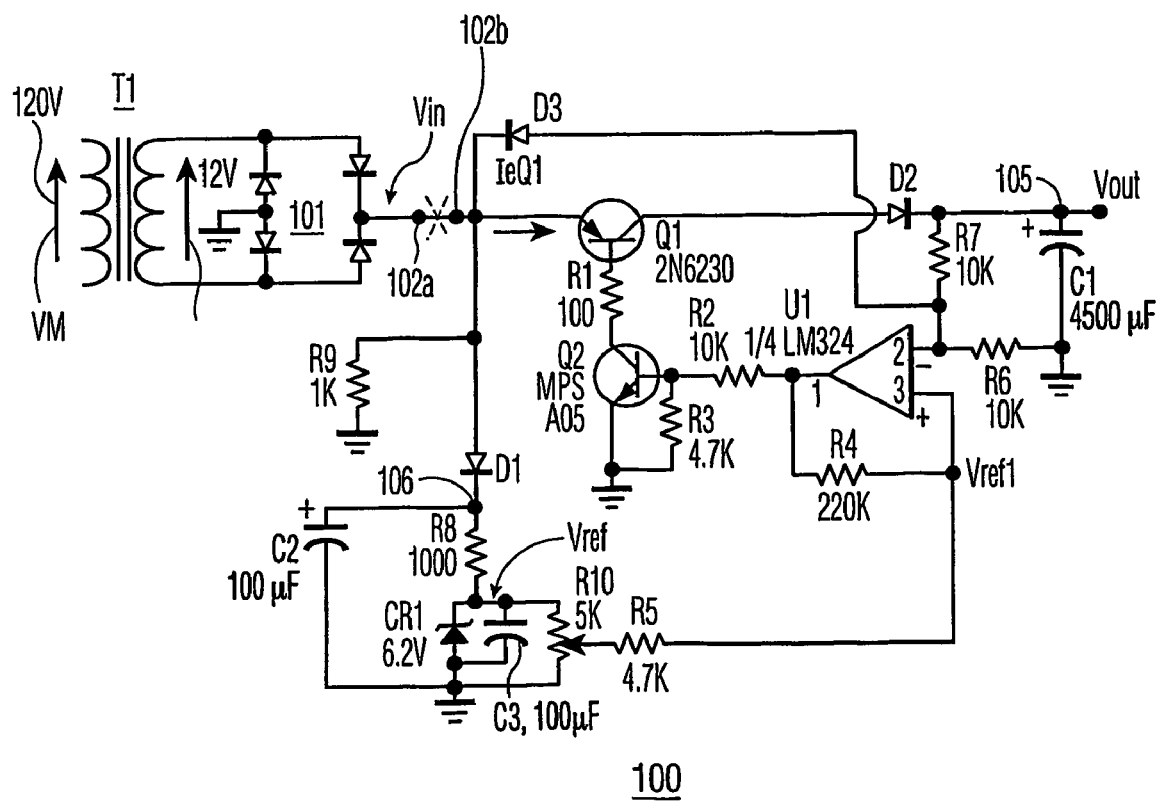
FIG. 2 illustrates a switch mode power supply, embodying an inventive feature.

FIG. 2 illustrates a switch mode power supply that includes a switch mode regulator 100, embodying an inventive feature. A mains supply voltage VM is applied via a line transformer T1 to a bridge rectifier 101. A voltage Vin, developed at a terminal 102a or 102b of rectifier 101, is coupled to an emitter of a regulator, series pass switching transistor Q1 via terminal 102a or 102b. Transistor Q1 is coupled in series with a rectifier or diode D2 to form a switching semiconductor. A collector of transistor Q1 is coupled via diode D2 to a filter capacitor C1 for producing a regulated, output supply voltage Vout in capacitor C1.

Voltage Vout is coupled via a voltage divider that includes a resistor R7 and a resistor R6, having, for example, equal values, to an inverting input terminal of a comparator or an operation amplifier U1, pin 2, of the type LM324. A reference voltage Vref is coupled via an adjustable voltage divider resistor R10 and a resistor R5 to a non-inverting input terminal, pin 3, of amplifier U1 to establish a reference voltage Vref1 at the non-inverting input terminal of amplifier U1, pin 3. An output terminal of amplifier U1, pin 1, is coupled via a voltage divider formed by a resistor R2 and a resistor R3 to the base of a switching transistor Q2. A collector of transistor Q2 is coupled via a current limiting resistor R1 to the base of transistor Q1.

FIGS. 1 and 3a–3c illustrate waveforms useful for explaining the operation of switching regulator 100 of FIG. 2. Similar symbols and numerals in FIGS. 1, 2 and 3a–3c indicate similar items or functions.

Figure 1:
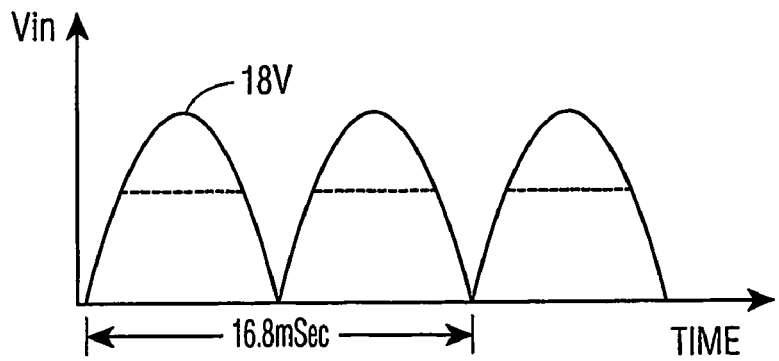
FIG. 1 illustrates an unfiltered full-wave rectified sinewave waveform produced from a mains supply voltage at a line frequency that is useful for explaining the operation of the circuit of FIG. 2.

Assume that terminal 102a of bridge rectifier 101 of FIG. 2 is separated from an emitter terminal 102b of transistor Q1, as shown by the broken lines in the form of the letter "x". Assume also that a resistive load, not shown, is applied to terminal 102a. In that case, the waveform of input supply voltage Vin at terminal 102a of FIG. 2 would be an unfiltered full-wave rectified sinewave waveform, of mains supply voltage VM having a line frequency of, for example, 60 Hz, as shown in FIG. 1. In the following description, assume that terminals 102a and 102b are connected to each other, as shown in FIG. 2, and are at the same potential.

Figure 3A:
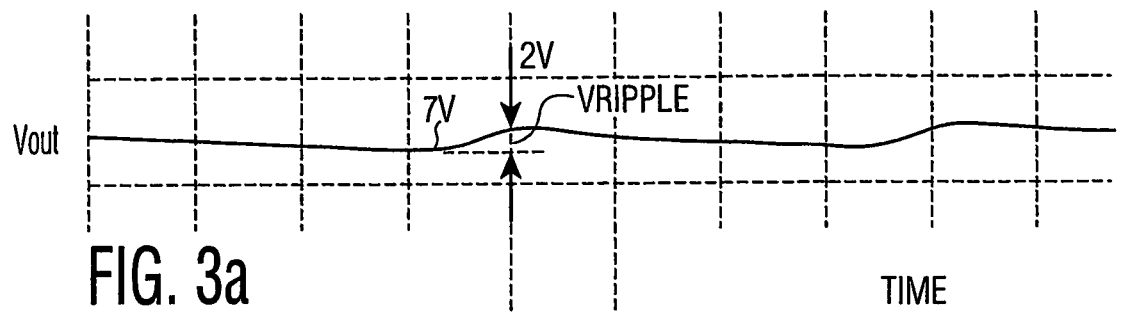
FIGS. 3a, 3b and 3c illustrate waveforms useful for explaining the operation of the power supply of FIG. 2.
Figure 3B:
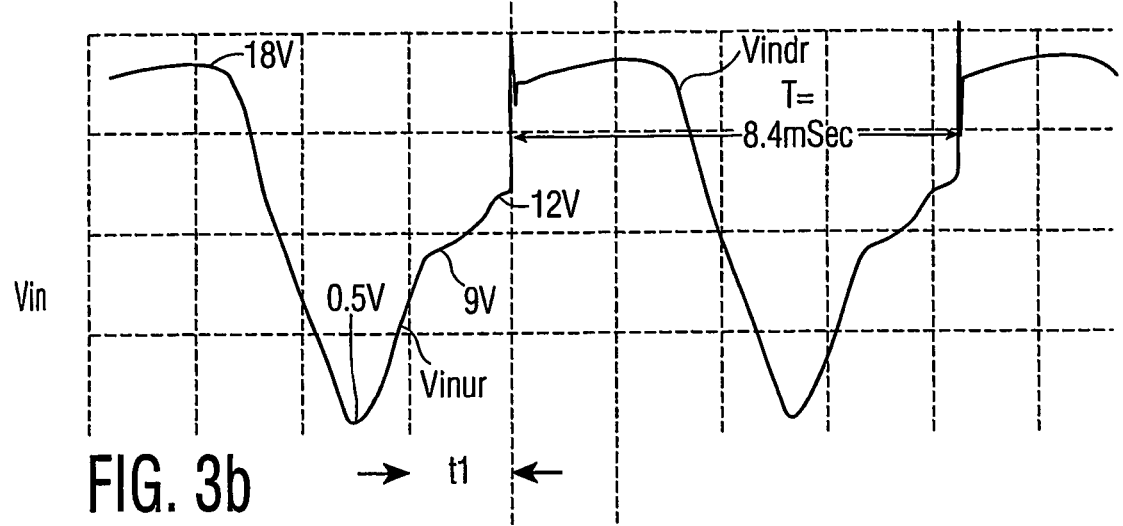

During each period 9 of voltage Vin of FIG. 3b, and as long as voltage Vout of FIG. 3a is lower than two times the voltage at the non-inverting input terminal, pin 3, of amplifier U1 of FIG. 2, an output voltage of amplifier U1, at output pin 1, is at a HIGH level, that is substantially equal to a 20 volt supply voltage, not shown, of amplifier U1. As a result, transistor Q2 is turned on causing transistor Q1 to turn on in a saturated condition. Thus, advantageously, transistor Q1 is conditioned for conduction before a current Ieq1 of FIG. 3c flows in transistor Q1.

Figure 3C:
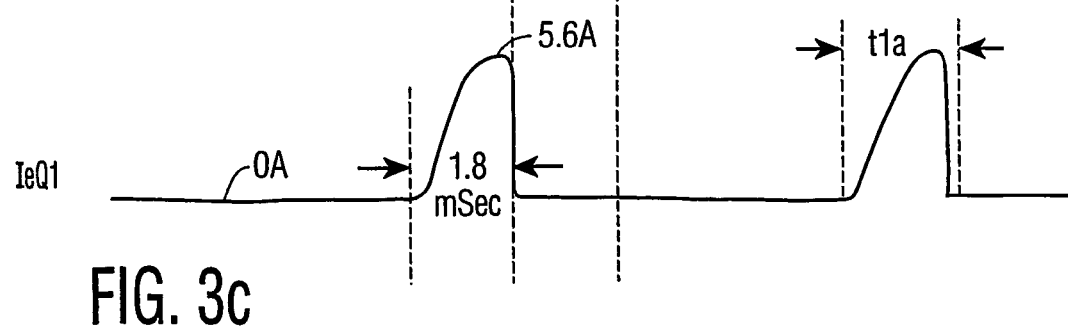

When voltage Vin becomes sufficiently large to forward bias diode D2, as indicated by a portion of voltage Vin that is above a broken line in FIG. 1, a collector-emitter voltage, not shown, of transistor Q1 of FIG. 2 changes polarity. Consequently, rectified supply current Ieq1 of FIG. 3c begins flowing through a current path that includes an emitter-collector current path of transistor Q1 of FIG. 2, diode D2 and filter capacitor C1 to charge capacitor C1 and produces voltage Vout. Voltage Vout varies together with an instantaneous value of voltage Vin, during an interval t1 of FIG. 3b. FIG. 3c illustrates a waveform of emitter current Ieq1 in transistor Q1 of FIG. 2, during interval t1, when voltage Vout of FIG. 2 is coupled to a load, not shown, of for example, 11 ohm.

In carrying out an inventive feature, output voltage Vout of FIG. 3a is regulated in a power efficient manner by initiating the flow of current Ieq1 of FIG. 3c in transistor Q1 of FIG. 2, when voltage Vin of FIG. 3b is approximately equal to voltage Vout of FIG. 3a or a magnitude of the collector-emitter voltage, not shown, of transistor Q1 of FIG. 2 is small. Current Ieq1 of FIG. 3c begins flowing in transistor Q1 of FIG. 2 after transistor Q1 is already conditioned for conduction. Therefore, advantageously, zero voltage switching is provided when transistor Q1 is turned on. The result is that less power is dissipated in transistor Q1 than if a significant voltage difference were developed between its emitter and collector of transistor Q1 of FIG. 2, prior to the initiation of emitter current Ieq1 of FIG. 3c.

When voltage Vout of FIG. 3a reaches a threshold level that is equal to two times the voltage at the non-inverting input terminal, pin 2, of amplifier U1 of FIG. 2, amplifier U1 output at pin 1 attains a LOW level, causing transistors Q2 and Q1 to turn off. Voltage Vout does not increase significantly above two times the voltage at the non-inverting input terminal, pin 3, of amplifier U1. Therefore, during a transition interval, not shown, when transistor Q1 is turned off, the power dissipation in transistor Q1 is also, advantageously, small. The process of replenishing the charge on capacitor C1 that was removed by the load circuit, not shown, is repeated in each period T of voltage Vin of FIG. 3b.

A positive feedback resistor R4 of FIG. 2, embodying an inventive feature, is coupled from output terminal of amplifier U1, pin 1, to the non-inverting input terminal of amplifier U1, pin 3, to provide hysteresis. Positive feedback resistor R4 causes the voltage difference between that at the inverting input terminal, pin2, and at the non-inverting input terminal, pin 3, of amplifier U1 to increase further.

Thereby, the hysteresis prevents amplifier U1 from turning on transistor Q1 again to avoid multiple occurrences of pulses of current Ieq1 of FIG. 3c, during a down-ramping portion Vindr of voltage Vin. Without the hysteresis, amplifier U1 of FIG. 2 might have been capable of turning on transistor Q1 to produce a second pulse of current Ieq1 in transistor Q1 and diode D2, during the same period T of FIG. 3b, when the voltage difference between the emitter and collector of transistor Q1 of FIG. 2 is significant and greater than zero. Thereby, the hysteresis prevents power dissipation increase in transistor Q1 by preserving the zero voltage switching.

A pull-down diode D3, embodying an inventive feature, is coupled between the emitter of transistor Q1 and the inverting input terminal, pin 2, of amplifier U1. Pull-down diode D3 couples voltage Vin to inverting input terminal, pin 2, of amplifier U1. Decreasing voltage Vin, during a down-ramping portion Vindr of voltage Vin of FIG. 3b, causes the voltage at output terminal of amplifier U1, pin 1, to attain the HIGH level again. Consequently, advantageously, transistor Q1 is conditioned for conduction in preparation to the next cycle.

Diode D2 is back biased immediately after transistor Q1 is conditioned for conduction. Therefore, current flow in conductive transistor Q1 that, otherwise, could have discharged capacitor C1 is prevented until the next conduction interval t1a of FIG. 3c. Only when voltage Vin of FIG. 3b again reaches a level that is approximately equal to voltage Vout of FIG. 3a, diode D2 begins conducting current Ieq of FIG. 3c again, as explained before.

The level of voltage Vout is, advantageously, maintained substantially the same in each period T of FIG. 3b regardless of variations in the amplitude of input voltage Vin. A variation in output load current may change a peak-to-peak ripple voltage VRIPPLE in FIG. 3a. However, the average value of DC output voltage Vout is maintained. Ripple voltage VRIPPLE can be controlled by appropriate selection of the value of capacitor C1 with respect to the load, as is well known. Thus, regulation is achieved for input voltage variations and for load variations.

A diode D1 of FIG. 2, a capacitor C2, and a resistor R8 form a transient suppresser. When transistor Q1 turns off, the leakage inductance in transformer T1 tends to keep the current flowing which produces a high voltage spike, not shown, which could damage transistor Q1 and/or produce noise in the regulated output. Diode D1 and capacitor C2 conduct this spike and resistor R8 provides a leakage path for the voltage generated. A junction terminal 106 of resistor R8, capacitor C2 and the cathode of diode D1 could also be used for providing an auxiliary supply voltage, such as needed to supply amplifier U1 or other circuits. In the arrangement of FIG. 2 it is used to derive reference voltage Vref.

What is claimed is:

1. A switch mode power supply, comprising:
   a source of a periodic input supply voltage;
   a filter capacitor;
   a power, switching semiconductor coupled to said source and to said capacitor for generating periodic rectified supply current pulse in said semiconductor having a first transition in a first direction and a second transition at an opposite direction at a frequency related to that of said input supply voltage to develop an output supply voltage in said capacitor, the power, switching semiconductor comprising a series pass transistor coupled in series with a rectifier for preventing said capacitor from discharging via said transistor, outside said rectified supply current pulse;
   a source of a first switch control signal for conditioning said semiconductor to conduction prior to said first transition in a manner to provide for zero voltage switching in said semiconductor, during said first transition; and a comparator responsive to a signal indicative of said output supply voltage and to a signal at a reference level for generating a second switch control signal for said semiconductor to produce said second transition of said current pulse that is modulated, in accordance with a difference between said output supply voltage and said reference level signal, said comparator having a positive feedback signal path that provides hysteresis with respect to said output supply voltage.

2. The power supply according to claim 1, wherein said first transition occurs, when a first difference between an instantaneous level of said input supply voltage and said output supply voltage is reached.

3. The power supply according to claim 1, wherein said hysteresis prevents said semiconductor for generating multiple current pulses in a given period of said input supply voltage in a manner to maintain the zero voltage switching.

4. The power supply according to claim 1, wherein said first transition occurs, when a voltage, developed between a pair of main current conducting terminals of said transistor, changes polarity.

5. The power supply according to claim 1, wherein said input supply voltage is coupled to a control terminal of said transistor via a signal path that bypasses a main current conducting path in said transistor to generate said first switch control signal at said control terminal of said transistor.

6. The power supply according to claim 1, further comprising a rectifier for rectifying a mains supply voltage to produce said input supply voltage having a sine-wave rectified waveform.

7. A switch mode power supply, comprising:
a source of a periodic input supply voltage;
a filter capacitor;
a power, switching transistor coupled to said source and to said capacitor for generating periodic rectified supply current pulse in said transistor having a first transition in a first direction and a second transition at an opposite direction at a frequency related to that of said input supply voltage to develop an output supply voltage in said capacitor, the power, switching transistor comprising a series pass transistor coupled in series with a rectifier for preventing said capacitor from discharging via said transistor, outside said rectified supply current pulse;

said input supply voltage being coupled to a control terminal of said transistor via a signal path that bypasses a main current conducting path in said transistor to generate a first switch control signal at said control terminal of said transistor for conditioning said transistor to conduction prior to said first transition in a manner to provide for zero voltage switching in said transistor, during said first transition; and a comparator responsive to a signal indicative of said output supply voltage and to a signal at a reference level for generating a second switch control signal for said semiconductor to produce said second transition of said current pulse that is modulated, in accordance with a difference between said output supply voltage and said reference level signal.

8. The power supply according to claim 7, wherein said signal path that bypasses said main current conducting path includes said comparator.

9. The power supply according to claim 7, wherein said first transition occurs, when a voltage developed between a pair of main current conducting terminals of said transistor changes polarity.

* * * * *